(12) United States Patent
Zeng

(10) Patent No.: US 12,479,248 B1
(45) Date of Patent: Nov. 25, 2025

(54) TOWING DEVICE

(71) Applicant: Ningbo Pinchuan Auto Parts Co., Ltd, Zhejiang (CN)

(72) Inventor: Jichao Zeng, Zhejiang (CN)

(73) Assignee: Ningbo Pinchuan Auto Parts Co., Ltd, Ningbo (CN)

( * ) Notice: Subject to any disclaimer, the term of this patent is extended or adjusted under 35 U.S.C. 154(b) by 0 days.

(21) Appl. No.: 19/243,327

(22) Filed: Jun. 19, 2025

(30) Foreign Application Priority Data

May 29, 2025 (CN) .......................... 202521095377.X

(51) Int. Cl.
| | | |
|---|---|---|
| *B60D 1/60* | (2006.01) | |
| *B60D 1/06* | (2006.01) | |
| *B60D 1/07* | (2006.01) | |
| *B60D 1/46* | (2006.01) | |

(52) U.S. Cl.
CPC .............. *B60D 1/60* (2013.01); *B60D 1/06* (2013.01); *B60D 1/07* (2013.01); *B60D 1/46* (2013.01)

(58) Field of Classification Search
CPC ... B60D 1/60; B60D 1/06; B60D 1/07; B60D 1/46
See application file for complete search history.

(56) References Cited

U.S. PATENT DOCUMENTS

| | | |
|---|---|---|
| 5,127,219 A | 7/1992 | Herron et al. |
| 5,513,870 A | 5/1996 | Hickman |
| 5,730,456 A * | 3/1998 | Bowers ................ B60D 1/60 280/495 |
| 6,419,179 B1 | 7/2002 | Ho |
| 7,425,013 B1 * | 9/2008 | Bartlett ................ B60D 1/40 280/479.3 |
| 8,201,843 B2 | 6/2012 | Neu et al. |
| 9,840,120 B1 * | 12/2017 | Alhazza ................ B60D 1/46 |
| 12,214,633 B1 * | 2/2025 | Jefferies ............... B60D 1/465 |
| 2004/0240934 A1 * | 12/2004 | Makos ................ B60D 1/60 403/322.3 |
| 2011/0241311 A1 * | 10/2011 | Wergin ................ B60D 1/36 280/491.2 |
| 2017/0079191 A1 * | 3/2017 | Cunningham ..... A01B 63/1006 |
| 2021/0331540 A1 * | 10/2021 | Gentner ................ B60D 1/54 |
| 2023/0132205 A1 * | 4/2023 | Strand ................ B60D 1/155 |
| 2023/0398823 A1 * | 12/2023 | Gentner ................ B60D 1/54 |

* cited by examiner

*Primary Examiner* — Valentin Neacsu
*Assistant Examiner* — Marlon A Arce

(57) ABSTRACT

A towing device includes a device body and a locking mechanism. The device body includes a trailing end and a mounting end. Each of opposite sides of the mounting end define a first through hole and a second through hole communicating with a tubular passage. The locking mechanism includes a driving assembly, a transmission assembly and a locking assembly connected in sequence. The transmission assembly and the locking assembly are respectively arranged in the tubular passage, and the locking assembly includes a first locking block and a second locking block which are mirror-symmetrical. The first locking block includes a first locking portion, and the second locking block includes a second locking portion.

9 Claims, 9 Drawing Sheets

TOWING DEVICE

CROSS REFERENCE TO RELATED APPLICATIONS

The present application claims priority benefits of Chinese patent application NO. 202521095377X, filed on May 29, 2025, the content of which is incorporated by reference in its entirety.

TECHNICAL FIELD

The present disclosure relates to the technical field of vehicle traction devices, and in particular to a towing device.

BACKGROUND

Installing a towing device on a vehicle is a common vehicle modification method. The towing device enables the vehicle to tow and haul various items, such as boats, cars, motorcycles, maintenance equipment, and other items unsuitable or inapplicable for ordinary vehicles.

Most current vehicles use a ball-type hitch assembly to achieve towing. The ball-type hitch assembly typically has a rectangular tubular insertion structure and at least two aligned mounting pin holes located on its opposite sides. When installing the vehicle towing device, after docking the rectangular tubular insertion structure with the receiving device of the target vehicle, one or more additional pin shafts are used to engage with the mounting pin holes, thereby achieving the assembly of the vehicle towing device with the target vehicle.

However, the above installation method between the vehicle towing device and the target vehicle has defects. In the above device, the additional pin shafts are easily lost. After the pin shafts are lost, users cannot install it quickly during emergencies.

Therefore, how to improve the vehicle towing device to avoid the above defects is a technical problem urgently needing resolution.

SUMMARY

A towing device includes a device body, a towing assembly, and a locking mechanism. The device body includes a trailing end and a mounting end, an interior of the mounting end defining a tubular passage extends in a preset direction, and the mounting end defines a first through hole and a second through hole in opposite sides of the mounting end, the first through hole and the second through hole are in communication with the tubular passage. The towing assembly is arranged on the trailing end. A locking mechanism includes a driving assembly, a transmission assembly and a locking assembly connected in sequence; the transmission assembly and the locking assembly are respectively arranged at the tubular passage, the locking assembly includes a first locking block and a second locking block which are mirror-symmetrical, the first locking block is provided with a first locking portion matching the first through hole, and the second locking block is provided with a second locking portion matching the second through hole. The first locking portion and the second locking portion respectively reciprocate synchronously inside and outside the mounting end via the first through hole and the second through hole in response to the driving assembly driving the transmission assembly to actuate the locking assembly.

BRIEF DESCRIPTION OF THE DRAWINGS

The drawings that form part of the present disclosure are provided to further illustrate the present disclosure. The illustrative embodiments and their descriptions of the present disclosure are intended to explain but do not constitute an undue limitation on the present disclosure.

DETAILED WAY

Figure 1:
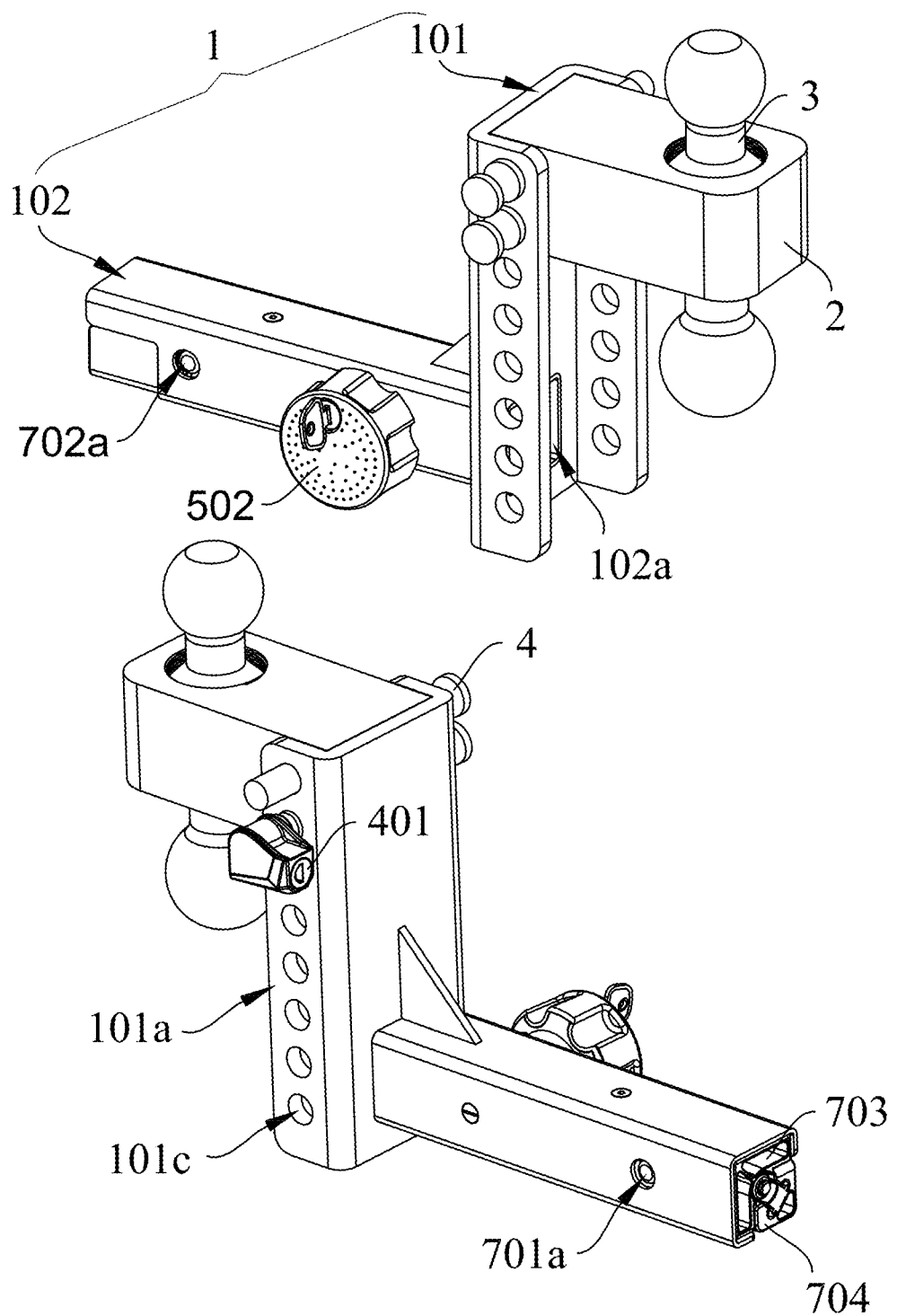
FIG. 1 is a perspective view of a towing device according to some embodiments of the present disclosure.

The following will be combined with the drawings in the embodiments of the present disclosure to clearly and completely describe the technical solutions in the embodiments of the present disclosure. Obviously, the described embodiments are only part but not all of the embodiments. Based on the embodiments in the present disclosure, all other embodiments obtained by those skilled in the art without creative work belong to the protection scope of the present disclosure.

It should be noted that all directional indications in the embodiments of the present disclosure (such as up, down, left, right, front, back, etc.) are only configured to explain the relative position relationship, movement, etc. between the components under a certain posture (as illustrated in the drawings). If the specific posture changes, the directional indication will also change accordingly.

In the present disclosure, unless otherwise clearly specified and limited, the terms "connection", "fixation", etc. should be understood in a broad sense. For example, "fixation" may be a fixed connection, a detachable connection, or an integral connection; it may be a mechanical connection or an electrical connection; it may be directly connected or indirectly connected through an intermediate medium, it may be the internal connection of two elements or the interaction relationship between two elements, unless otherwise clearly defined. For those skilled in the art, the specific meanings of the above terms in the present disclosure may be understood according to the specific circumstances.

In addition, if there are descriptions involving "first", "second", etc. in the embodiments of the present disclosure, the descriptions of "first", "second", etc. are only for descriptive purposes and cannot be understood as indicating or implying their relative importance or implicitly indicating the number of technical features indicated. Therefore, the features defined as "first" and "second" may explicitly or implicitly include at least one of the features. In addition, the meaning of "and/or" appearing in the full text includes three parallel schemes. Taking "A and/or B" as an example, it includes scheme A, scheme B, or schemes that satisfy both A and B. In addition, the technical schemes between the various embodiments may be combined with each other, but they must be based on the ability of those skilled in the art to implement them. When the combination of technical schemes is contradictory or cannot be implemented, it should be considered that such a combination of technical schemes does not exist and is not within the protection scope required by the present disclosure.

As illustrated in FIG. 1 to FIG. 9, according to some embodiments of the present disclosure, a towing device is provided. The towing device includes a device body 1, a towing assembly and a locking mechanism.

In some embodiments, as illustrated in FIG. 1 to FIG. 4, the device body 1 which may be formed by a casting or welding process includes a mounting end 102 and a trailing end 101. The mounting end 102 is in the shape of a square tube. An interior of the mounting end 102 defines a tubular passage 102a extending in a horizontal direction. The trailing end 101 is arranged at one end of the tubular passage 102a. Each of the left and right sides of the mounting end 102 is respectively defined with a first through hole 102b or a second through hole 102c in communication with the tubular passage 102a. The first through hole 102b and the second through hole 102c are respectively configured for docking with the mounting holes in the receiver of a target vehicle. One side of the mounting end 102 is also defined with a third through hole 102d in communication with the tubular passage 102a.

In some embodiments, as illustrated in FIG. 1 to FIG. 8, a locking mechanism is provided on the mounting end 102, and the locking mechanism includes a driving assembly 5, a transmission assembly 6 and a locking assembly connected in sequence. The driving assembly 5 includes a driving shaft 501 and a first toothed transmission structure provided thereon. The transmission assembly 6 includes a transmission shaft 601 and a second toothed transmission structure provided thereon. The first toothed transmission structure and the second toothed transmission structure are meshed with each other. The locking assembly includes a first slider 703, a first locking block 701 and a second locking block 702. The first locking block 701 and the second locking block 702 are mirror-symmetrical. The first slider 703 is disposed inside the tubular passage 102a, and is screwed to one end of the transmission shaft 601 away from the driving shaft 501 by a threaded structure. The first locking block 701 and the second locking block 702 are respectively connected to the first slider 703. The first locking block 701 includes a first locking portion 701a matching the first through hole 102b, and the second locking block 702 is provided with a second locking portion 702a matching the second through hole 102c. When the driving assembly 5 drives the transmission assembly 6 to actuate the locking assembly, the first slider 703 slides along the tubular passage 102a, and drives the first locking portion 701a and the second locking portion 702a to synchronously reciprocate and retract inside and outside the first through hole 102b and the second through hole 102c of the mounting end 102, respectively, achieving the clamping of the mounting end 102 with the receiver of the target vehicle.

In some embodiments, as illustrated in FIG. 1 to FIG. 8, the meshing manner between the first toothed transmission structure and the second toothed transmission structure is configured as a bevel gear meshing transmission. The drive shaft 501 enters into the interior of the tubular passage 102a from the third through hole 102d. A bevel gear shaft section 501a is provided on a shaft section of the drive shaft 501 and located inside the passage. The transmission shaft 601 is arranged inside the passage, and an end of the transmission shaft 601 facing the driving shaft 501 is connected with a bevel gear 602 matching the bevel gear shaft section 501a. The bevel gear 602 of the transmission shaft 601 is meshed with the bevel gear shaft section 501a of the driving shaft 501. One end, away from the driving shaft 501, of the transmission shaft 601 defines a second external thread 601a, and the first slider 703 defines a second threaded hole 703e matching the second external thread 601a. The second threaded hole 703e of the first slider 703 is screwed to the second external thread 601a of the transmission shaft 601. A locking nut 603 is provided at an end of the second external thread 601a of the transmission shaft 601. The locking nut 603 is configured to prevent the first slider 703 from being detached from the transmission shaft 601. The first slider 703 is longitudinally defined with a first guide groove 703a and a second guide groove 703b which are mirror-symmetrical and form an angle with respect to an extension direction of the tubular passage 102a, respectively. The first locking block 701 includes a first locking portion 701a and a first guide portion 701b which are in the shape of a column pin and perpendicular to each other. The second locking block 702 includes a second locking portion 702a and a second guide portion 702b which are in the shape of a column pin and perpendicular to each other. The first locking block 701 and the second locking block 702 are mirror-symmetrical and arranged on the left and right sides of the transmission shaft 601, respectively. The first guide portion 701b of the first locking block 701 is slidably connected to the first guide groove 703a of the first slider 703. The second guide portion 702b of the second locking block 702 is slidably connected to the second guide groove 703b of the first slider 703. When the drive shaft 501 rotates, the bevel gear shaft section 501a drives the bevel gear 602 meshing therewith, thereby driving the transmission shaft 601 to rotate. During the rotation of the transmission shaft 601, the second external thread 601a on the transmission shaft 601 drives the first slider 703 threaded thereon to slide along the tubular passage 102a. When the first slider 703 is sliding, the first guide groove 703a and the second guide groove 703b of the first slider 703 synchronously drives the first locking portion 701a and the second locking portion 702a to reciprocate and extend into the first through hole 102b and the second through hole 102c respectively, achieving the self-locking function of the locking mechanism.

In some embodiments, as illustrated in FIG. 1 to FIG. 9, the locking assembly further comprises a second slider 704. A third guide portion 703c extending in the same direction as the tubular passage 102a is provided on one side of the first slider 703. A bottom of the third guide portion 703c defines a first inclined surface 703d. The second slider 704 defines a third guide groove 704a at a position corresponding to the third guide portion 703c. A bottom of the third guide groove 704a defines a second inclined surface 704b matching the first inclined surface 703d. The third guide groove 704a of the second slider 704 may be slidably connected to the third guide portion 703c on the first slider 703. When the first slider 703 and the second slider 704 are slidably connected, the first inclined surface 703d of the first slider 703 abuts against the second inclined surface 704b of the second slider 704. When the first slider 703 slides along the tubular passage 102a driven by the transmission assembly 6, under the action of the first inclined surface 703d and the second inclined surface 704b abutting against each other, the first slider 703 slides and pushes the second slider 704 to slide outward. When the second slider 704 is tightly matched with an inner wall of a square opening of a body of the receiver of the target vehicle, the first slider 703 is blocked and stops moving. When the second slider 704 slides to different positions, it adapts to varying aperture dimensions of target vehicle receivers, solving the universal fit issues across different models with inconsistent square openings. The engagement between the first inclined surface 703d and the second inclined surface 704b prevents the disengagement phenomenon of the locking assembly due to severe towing vibrations.

In some embodiments, as illustrated in FIG. 1 to FIG. 9, the locking assembly also includes a first positioning portion 705 and a second positioning portion 706. A top and a bottom of the mounting end 102 is respectively defined with a sixth through hole 102e or a seventh through hole 102f. The sixth through hole 102e and the seventh through hole 102f are respectively defined with an internal thread. The first positioning portion 705 and the second positioning portion 706 are respectively screwed to the sixth through hole 102e and the seventh through hole 102f by means of screws. When the first slider 703 abuts against the first positioning portion 705 during sliding, the second slider 704 abuts against the second positioning portion 706. At this time, the first locking portion 701a and the second locking portion 702a extend to their maximum dimension, and the second slider 704 slides along the first inclined surface 703b of the first slider 703 with respect to the second inclined surface 704b, reaching an extreme position. The first positioning portion 705 and the second positioning portion 706 prevent excessive rotation of the driving assembly 5, which could compromise effective locking of the locking assembly.

In some embodiments, as illustrated in FIG. 1 to FIG. 7, a first lock 502 is provided on an end of the driving shaft 501 away from the device body. The first lock 502 is configured to lock the drive assembly 5. When the first lock 502 is engaged, external driving force drive becomes ineffective, causing the lock housing to idle. The drive shaft 501 cannot rotate freely, preventing external forces from transmitting to the transmission shaft 601 through the drive shaft 501. This effectively avoids disengagement of the towing device during use due to unintentional rotation of the drive shaft 501, and simultaneously preventing theft of the unattended towing device.

In some embodiments, as illustrated in FIG. 1 to FIG. 6, a trailing end 101 includes two sidewalls 101a that are oppositely arranged and extend in the longitudinal direction respectively, and a fourth guide groove 101b is formed between the two sidewalls 101a. A trailing arm 2 is slidably connected in the fourth guide groove 101b. Each of the two sidewalls 101a is defined with a plurality of fourth through holes 101c in the longitudinal direction. The trailing arm 2 is defined with two fifth through holes 201 that match the fourth through holes 101c in the longitudinal direction. The height position of the trailing arm 2 may be adjusted longitudinally by sliding it along the fourth slide grooves. After adjustment, two fixing pins 4 are inserted into the fourth through hole 101c and the fifth through hole 201 to secure the relative positioning between the trailing arm 2 and the trailing end 101.

Figure 2:
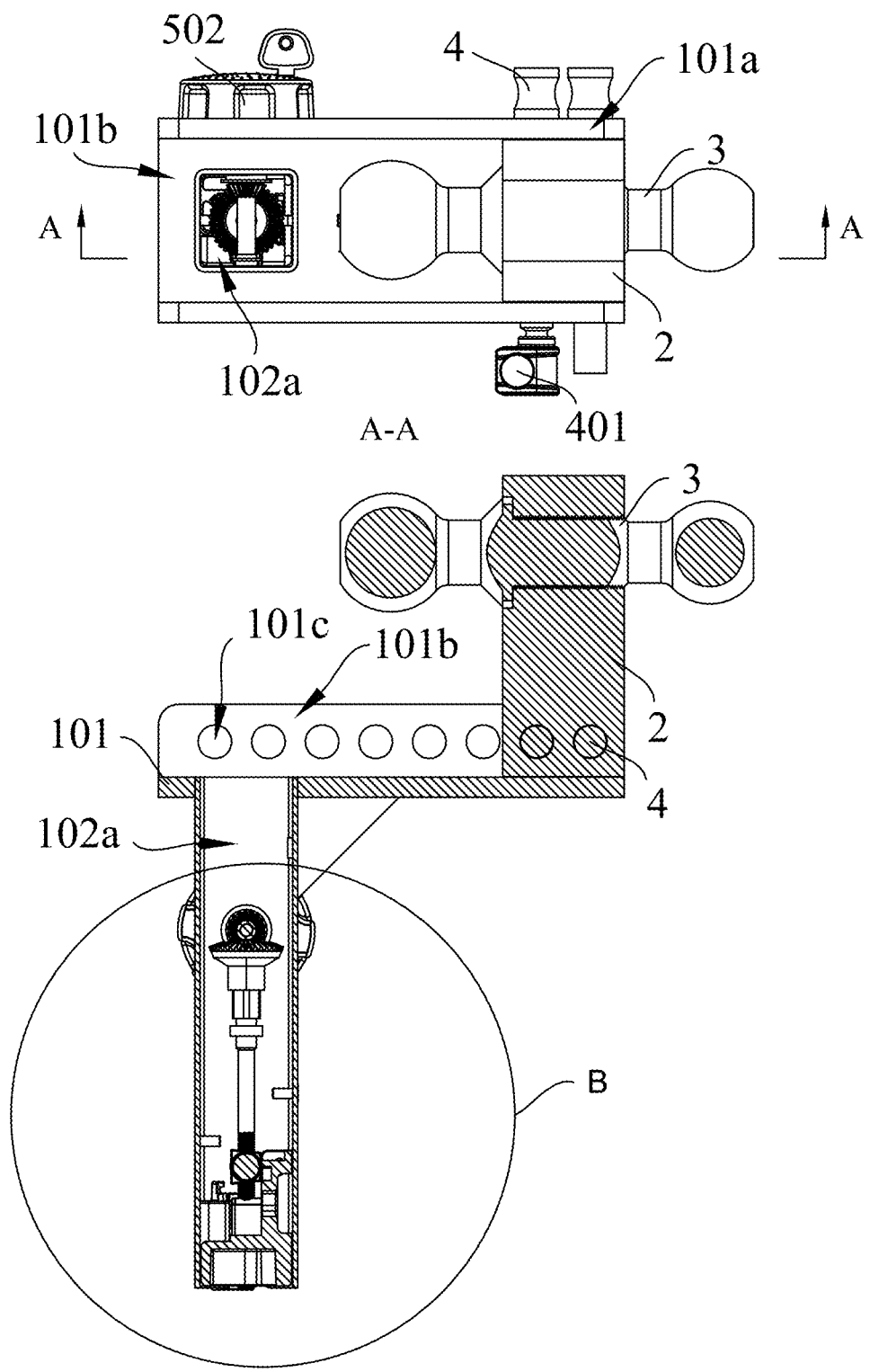
FIG. 2 is a cross-sectional view of a towing device according to some embodiments of the present disclosure.
Figure 3:
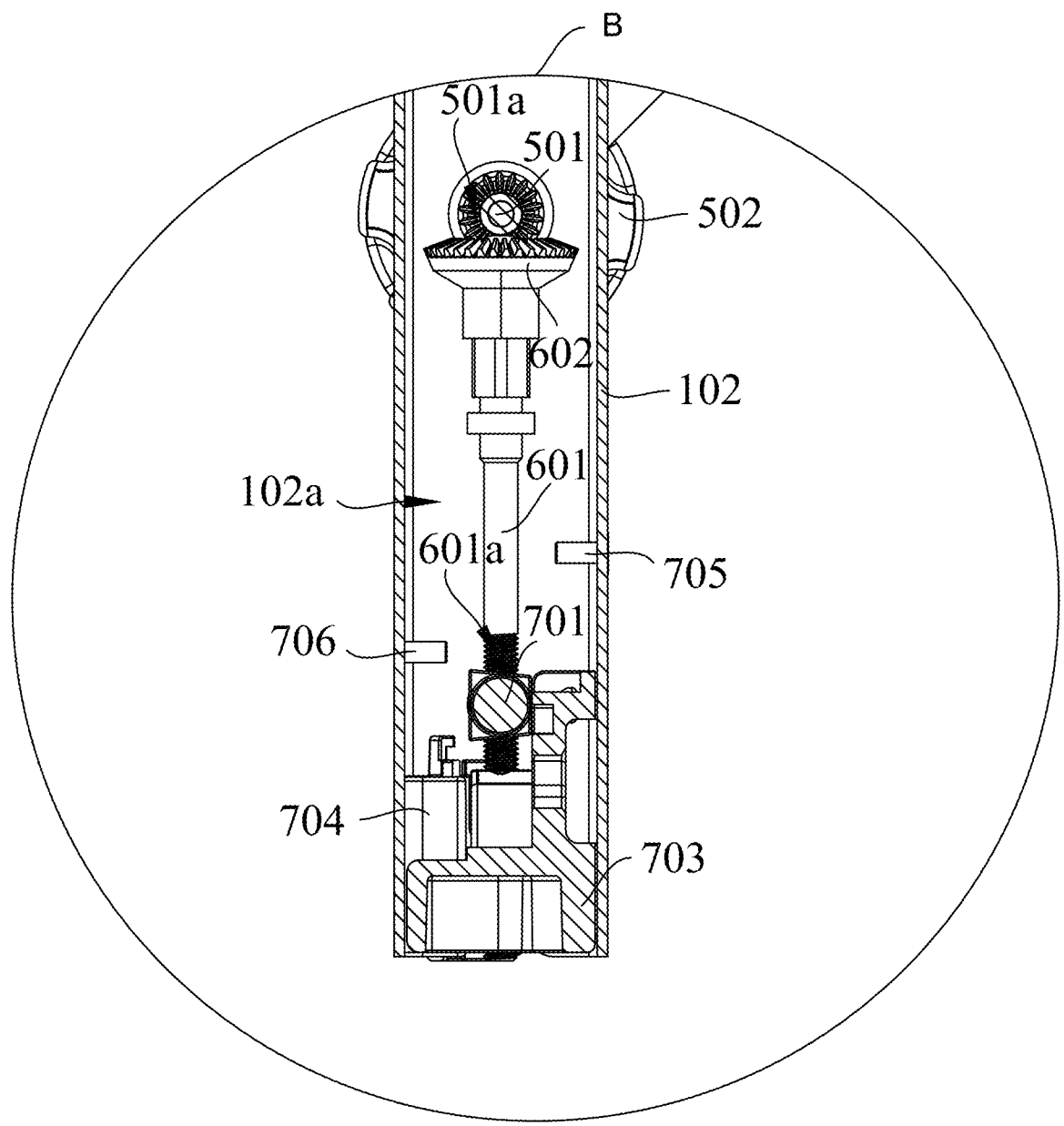
FIG. 3 is an enlarged view of area B in FIG. 2.
Figure 4:
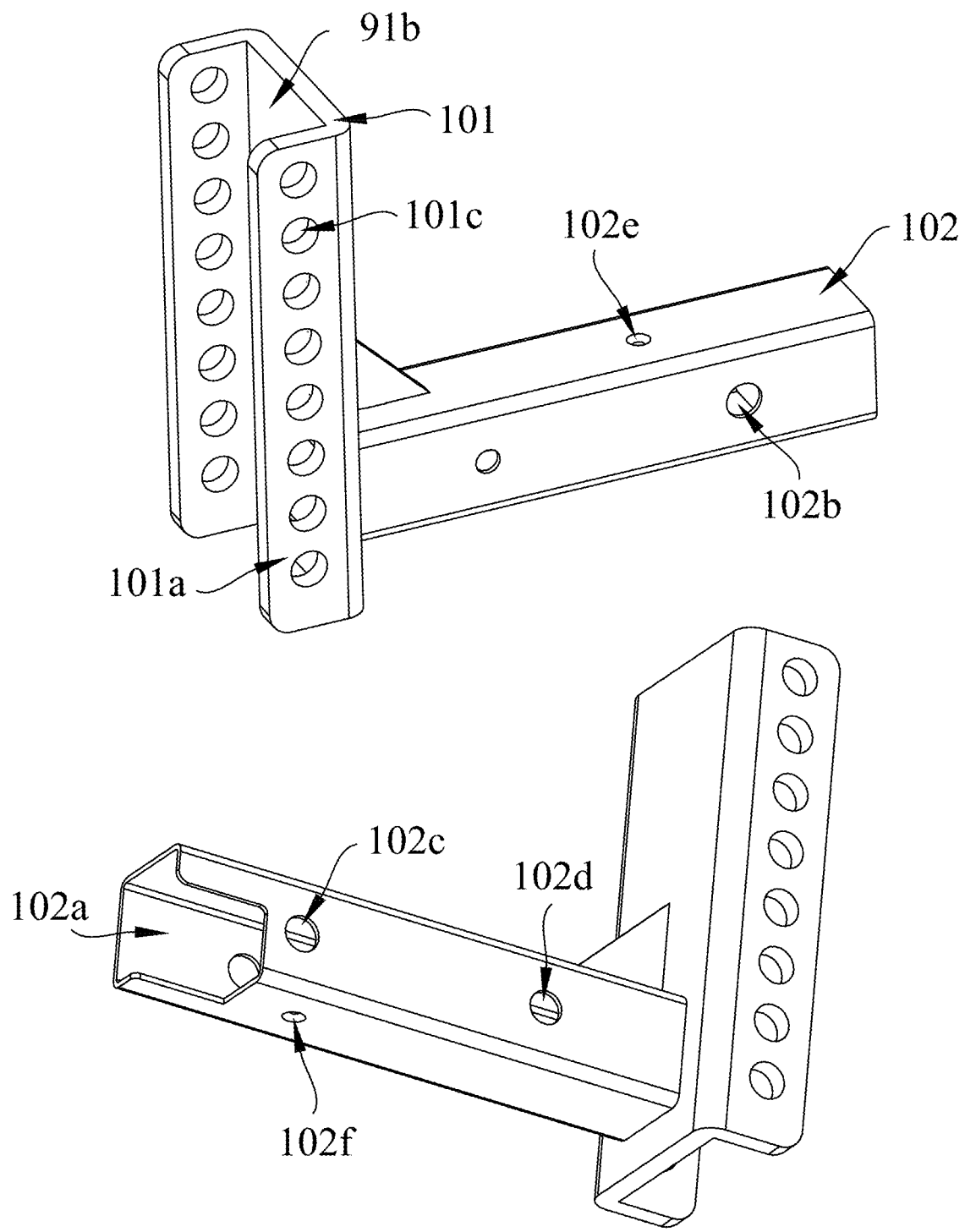
FIG. 4 is a perspective view of a device body of a towing device according to some embodiments of the present disclosure.
Figure 5:
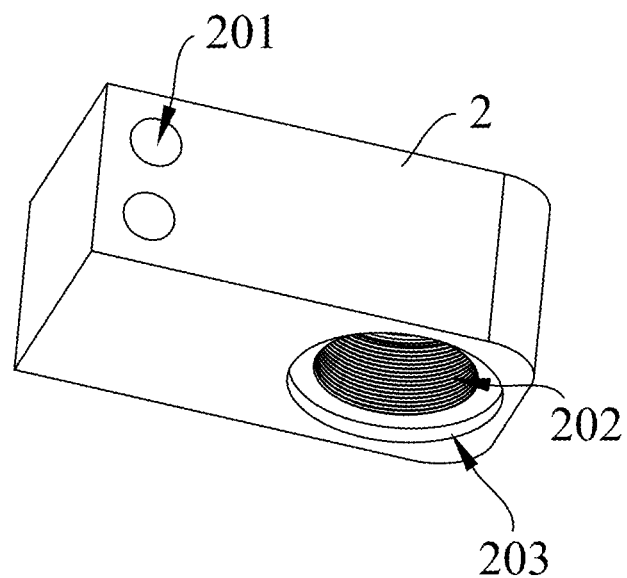
FIG. 5 is a perspective view of a trailing arm and a towing part of a towing device according to some embodiments of the present disclosure.
Figure 5:
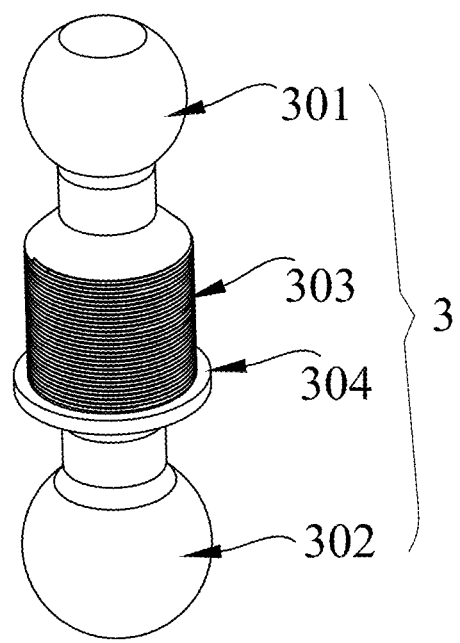
Figure 6:
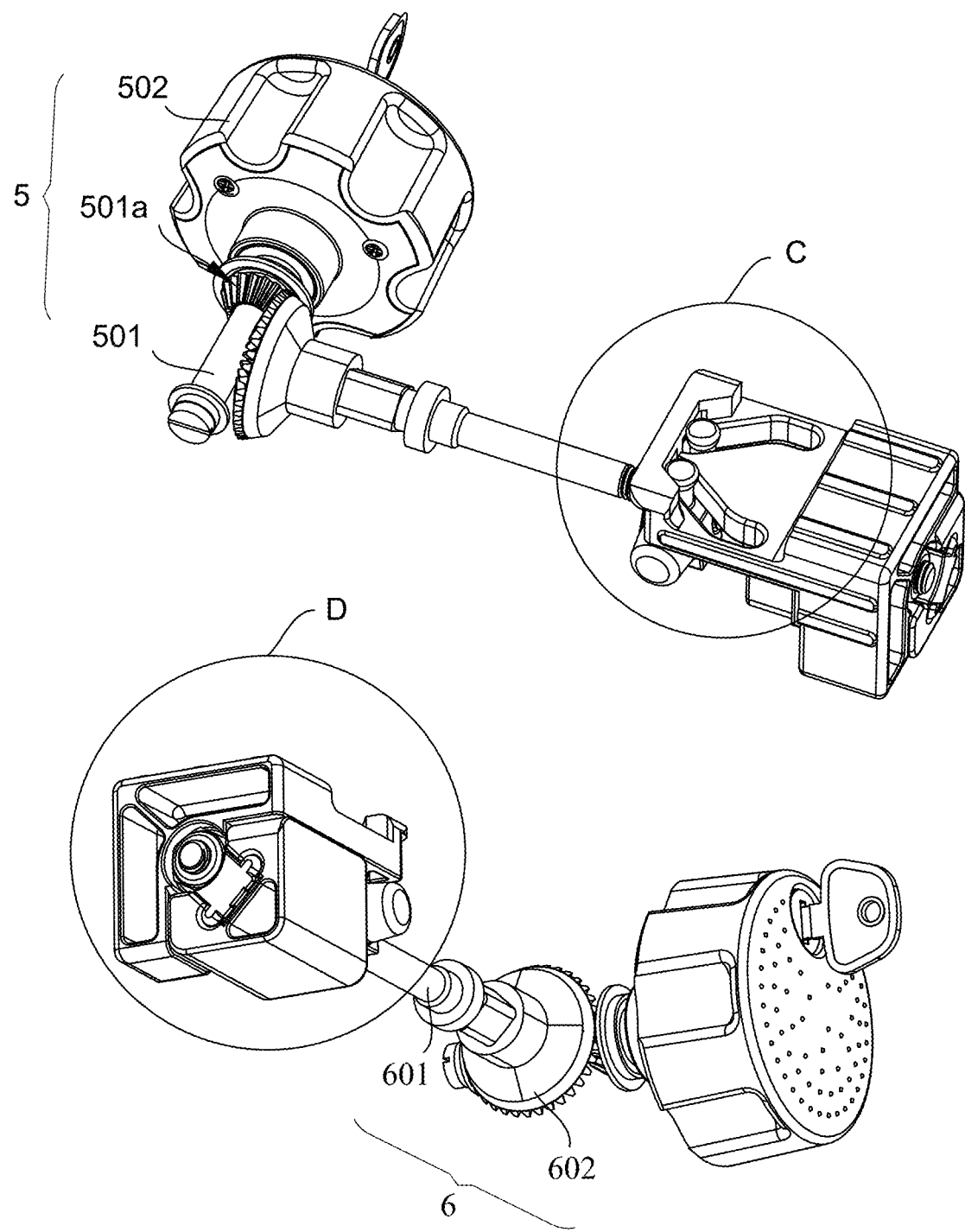
FIG. 6 is a perspective view of a locking mechanism of a towing device according to some embodiments of the present disclosure.
Figure 7:
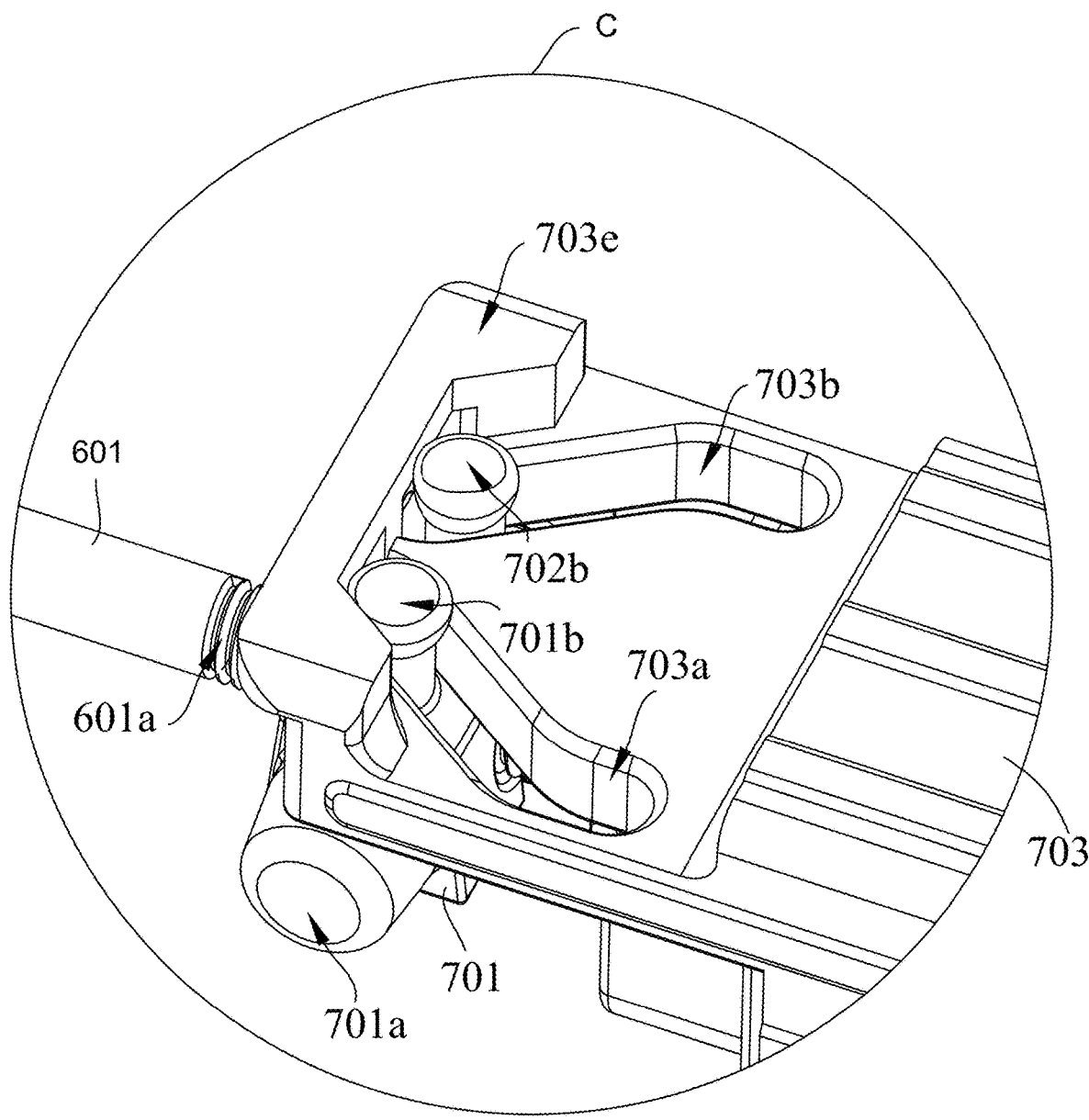
FIG. 7 is an enlarged view of area C in FIG. 6.
Figure 8:
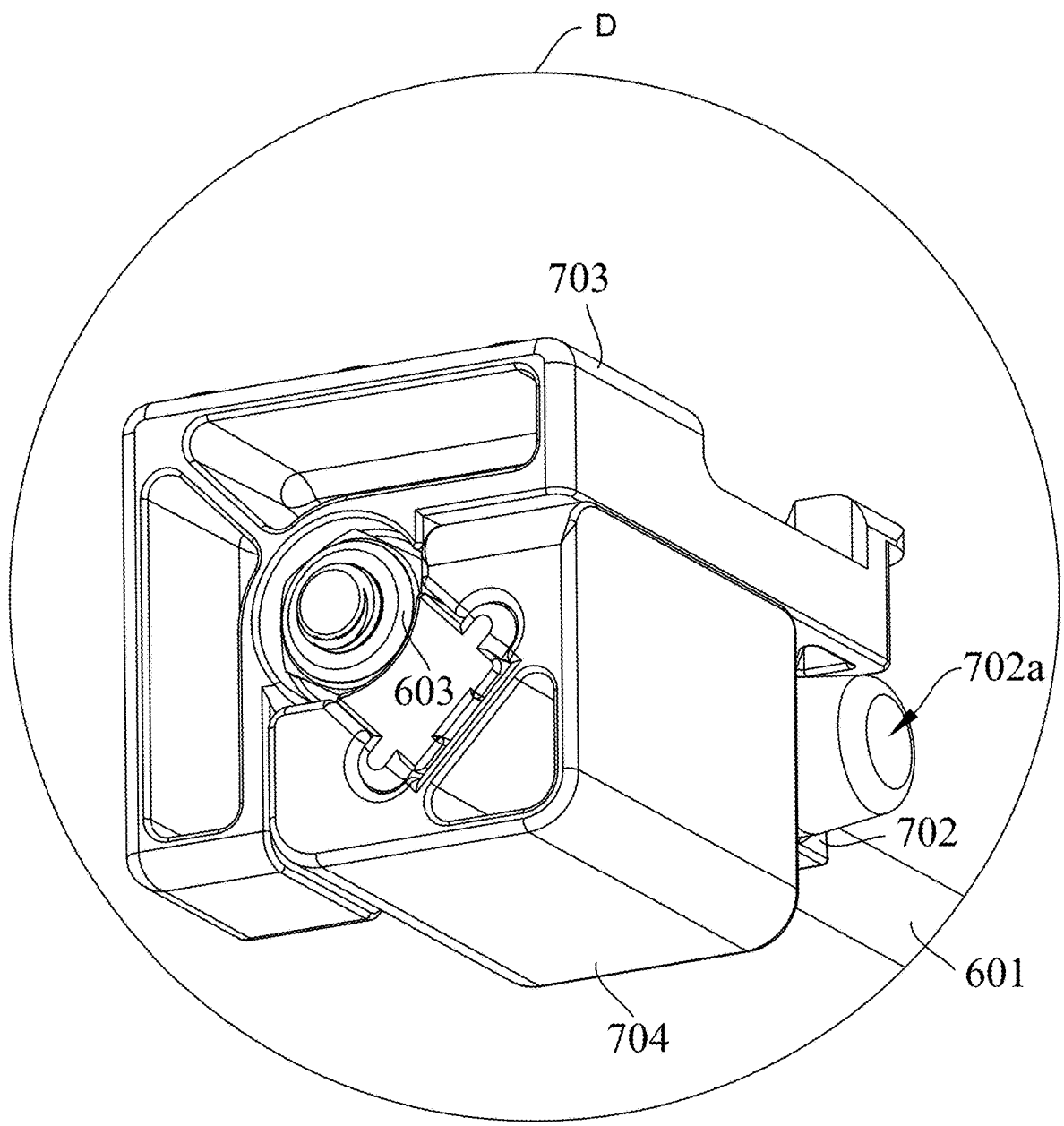
FIG. 8 is an enlarged view of area D in FIG. 6.
Figure 9:
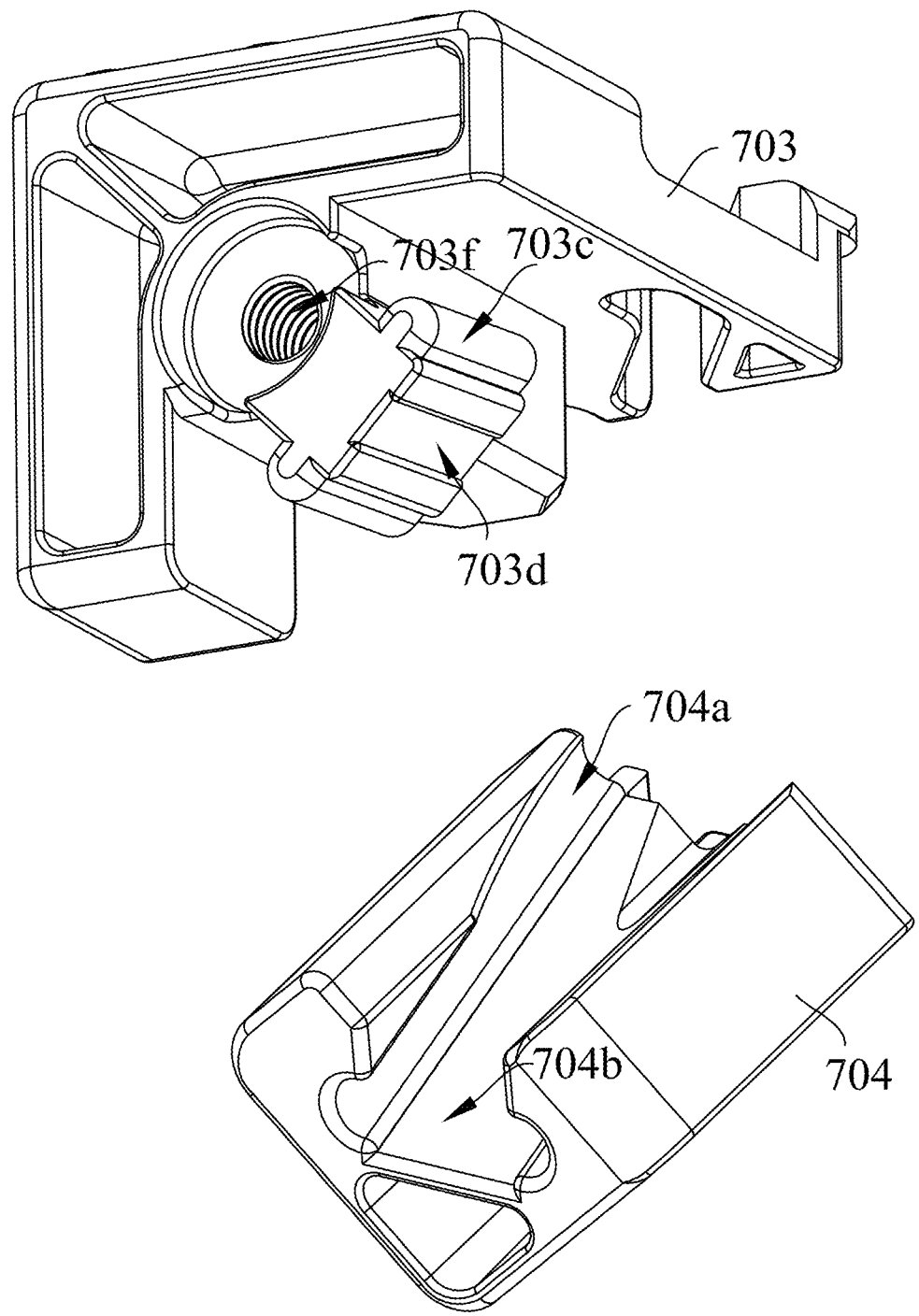
FIG. 9 is a perspective view of a first slider and a second slider of a towing device according to some embodiments of the present disclosure.

In some embodiments, as illustrated in FIG. 1 and FIG. 2, an end of the at least one fixing pin 4 is provided with a second lock 401, and the second lock 401 is configured to limit the insertion and extraction of the at least one fixing pin 4. When the second lock 401 is locked, the at least one fixing pin 4 cannot be pulled out, which prevents the at least one fixing pin 4 from falling off due to vibration, and the towing device from being stolen.

In some embodiments, as illustrated in FIG. 1 to FIG. 6, an end of the trailing arm 2 away from the trailing end 101 is defined with a first threaded hole 202 in the longitudinal direction, and a bottom of the first threaded hole 202 is defined with a first limiting surface 203. A towing part 3 is defined with a first external thread 303 matching the first threaded hole 202, and the towing part 3 is defined with a second limiting surface 304 at a position corresponding to the first limiting surface 203. The first external thread 303 of the towing part 3 may be screwed with the first threaded hole 202 of the trailing arm 2. When the towing part 3 is in operation, the first limiting surface 203 and the second limiting surface 304 abut against each other to protect the threaded structure and prevent the towing part 3 from falling off the trailing arm 2.

In some embodiments, as illustrated in FIG. 1 to FIG. 6, the towing part 3 includes a first ball head hook 301 and a second ball head hook 302, and the first ball head hook 301 and the second ball head hook 302 are respectively located at the two ends of the towing part 3 in the longitudinal direction. When the towing part 3 is installed on the trailing arm 2, the two ball head hooks are respectively located on top and bottom sides of the trailing arm 2. Using two ball head hooks for towing operations may improve towing safety and stability. The first ball head hook 301 and the second ball head hook 302 may have different diameter specifications, and the ball head hooks of the two diameter specifications may be swapped up and down as needed.

From the above description, it may be seen that the above-mentioned embodiments of the present disclosure achieve the following technical effects.

Compared with the related art, when using the towing device provided by the present disclosure, the first locking portion 701a and the second locking portion 702a of the locking assembly inside the passage is driven by the driving assembly 5 and the transmission assembly 6 to synchronously extend or retract relative to the mounting end 102. Simultaneously, the second slider 704 provides a lateral adaptation support for a square mouth of the target vehicle receiver to achieve stable self-locking, thereby completing the rapid installation between the towing device and the receiver of the target vehicle. The height adjustment of the trailing arm 2 is achieved by inserting the at least one fixing pin 4 into the trailing end 101 or pulling the at least one fixing pin 4 out of the trailing end 101. The first lock 502 and the second lock 401 may respectively prevent the driving assembly 5 and the at least one fixing pin 4 from being accidentally touched, and may also play an anti-theft role.

The above are only some embodiments of the present disclosure, and does not limit the patent scope of the present disclosure. All equivalent structural changes made by using the contents of the present disclosure specification and drawings under the inventive concept of the present disclosure, or directly/indirectly applied in other related technical fields are included in the protection scope of the present disclosure.

What is claimed is:
1. A towing device, comprising:
 a device body comprising a trailing end and a mounting end, an interior of the mounting end defining a tubular passage extending in a preset direction, and the mounting end defining a first through hole and a second through hole in opposite sides of the mounting end, the first through hole and the second through hole in communication with the tubular passage;

a towing assembly arranged on the trailing end; and a locking mechanism comprising a driving assembly, a transmission assembly and a locking assembly connected in sequence; the transmission assembly and the locking assembly being respectively arranged at the tubular passage, the locking assembly comprising a first locking block and a second locking block which are mirror-symmetrical, the first locking block being provided with a first locking portion matching the first through hole, and the second locking block being provided with a second locking portion matching the second through hole;

wherein the first locking portion and the second locking portion respectively reciprocate synchronously inside and outside the mounting end via the first through hole and the second through hole in response to the driving assembly driving the transmission assembly to actuate the locking assembly.

2. The towing device according to claim 1, wherein the driving assembly comprises a first toothed transmission structure arranged inside the tubular passage;

the transmission assembly comprises a transmission shaft arranged in the tubular passage and extending in the preset direction, an end of the transmission shaft facing the first toothed transmission structure is provided with a second toothed transmission structure meshing with the first toothed transmission structure, and an end of the transmission shaft away from the second toothed transmission structure is provided with a threaded structure;

the locking assembly further comprises a first slider, the first slider is threadedly connected to the threaded structure and is capable of sliding back and forth along the tubular passage through the transmission shaft; and the first slider is defined with a first guide groove and a second guide groove, the first guide groove and the second guide groove are mirror-symmetrical and form an angle along an extension direction of the tubular passage, the first locking block comprises a first guide portion, the second locking block comprises a second guide portion, the first guide portion of the first locking block is slidably connected to the first guide groove, and the second guide portion of the second locking block is slidably connected to the second guide groove.

3. The towing device according to claim 2, wherein one side of the mounting end is defined with a third through hole in communication with the tubular passage;

the driving assembly further comprises a driving shaft, the first toothed transmission structure is disposed on the driving shaft, and the driving shaft extends into the third through hole to allow the first toothed transmission structure to be disposed within the tubular passage and be capable of rotating in the tubular passage.

4. The towing device according to claim 2, wherein the locking assembly further comprises a second slider;

the first slider comprises a third guide portion extending in the preset direction, a bottom of the third guide portion defines a first inclined surface, the second slider defines a third guide groove corresponding to the third guide portion, the third guide groove defines a second inclined surface corresponding to the first inclined surface, and the third guide groove of the second slider is slidably connected to the third guide portion of the first slider; and the first slider is capable of driving the second slider to slide along the first inclined surface in response to the first inclined surface abutting against the second inclined surface.

5. The towing device according to claim 3, wherein the driving assembly further comprises a first lock arranged at the end of the driving shaft and located outside the tubular passage, and driving shaft is not capable of rotating in response to the first lock being locked.

6. The towing device according to claim 4, wherein the locking assembly further comprises a first positioning portion, the first positioning portion is at least partially disposed in the tubular passage;

the first locking portion and the second locking portion extend to a maximum dimension in response to the first slider abutting against the first positioning portion, and the second inclined surface of the second slider slides along the first inclined surface to an extreme position.

7. The towing device according to claim 1, wherein the trailing end comprises two sidewalls oppositely arranged and spaced apart, the two sidewalls extend longitudinally to define a fourth guide groove, and the two sidewalls respectively define a plurality of fourth through holes in communication with the fourth guide groove in the longitudinal direction;

the towing assembly comprises a trailing arm, a towing part and at least one fixing pin matching the plurality of fourth through holes, the trailing arm is slidably connected to the trailing end by means of the fourth guide groove, and the towing part is connected to an end of the trailing arm away from the trailing end; and the trailing arm defines at least one fifth through hole that matches the plurality of fourth through holes, and the at least one fixing pin extends into the fourth through hole and the fifth through hole to secure the trailing arm to the fourth guide groove.

8. The towing device according to claim 7, wherein the towing part is detachably connected to the trailing arm, and the towing part comprises a first ball head hook, and the first ball head hook is located on a top side of the trailing arm.

9. The towing device according to claim 7, wherein a second lock is provided at an end of the at least one fixing pin, and the at least one fixing pin is not capable of being disengaged in response to the second lock being locked.

* * * * *